(12) United States Patent
Mashimo et al.

(10) Patent No.: US 12,111,767 B2
(45) Date of Patent: *Oct. 8, 2024

(54) METHOD AND APPARATUS FOR A PAGE-LOCAL DELTA-BASED PREFETCHER

(71) Applicant: Advanced Micro Devices, Inc., Santa Clara, CA (US)

(72) Inventors: Susumu Mashimo, Boxborough, MA (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,968

(22) Filed: Apr. 19, 2023

(65) Prior Publication Data
US 2023/0376420 A1      Nov. 23, 2023

Related U.S. Application Data

(63) Continuation of application No. 16/927,786, filed on Jul. 13, 2020, now Pat. No. 11,726,917.

(60) Provisional application No. 63/044,468, filed on Jun. 26, 2020.

(51) Int. Cl.
*G06F 12/0862* (2016.01)
*G06F 9/30* (2018.01)
*G06F 12/0877* (2016.01)
*G06F 18/214* (2023.01)

(52) U.S. Cl.
CPC ...... *G06F 12/0862* (2013.01); *G06F 9/30036* (2013.01); *G06F 9/30047* (2013.01); *G06F 9/30101* (2013.01); *G06F 12/0877* (2013.01); *G06F 18/214* (2023.01); *G06F 2212/6024* (2013.01)

(58) Field of Classification Search
CPC ............. G06F 9/30036; G06F 9/30047; G06F 9/30101; G06F 12/0862; G06F 12/0877; G06F 18/214; G06F 2212/6024
See application file for complete search history.

(56) References Cited

U.S. PATENT DOCUMENTS

| | | |
|---|---|---|
| 7,430,650 B1 | 9/2008 | Ross |
| 11,726,917 B2 | 8/2023 | Mashimo et al. |
| 2007/0288697 A1 | 12/2007 | Keltcher |
| 2019/0065375 A1* | 2/2019 | Al Sheikh ........... G06F 12/1063 |
| 2019/0138451 A1 | 5/2019 | Alam et al. |

(Continued)

OTHER PUBLICATIONS

U.S. Appl. No. 16/927,786, "Non-Final Office Action", U.S. Appl. No. 16/927,786, Aug. 4, 2022, 18 pages.

(Continued)

*Primary Examiner* — Aracelis Ruiz
(74) *Attorney, Agent, or Firm* — FIG. 1 Patents

(57) ABSTRACT

A method includes recording a first set of consecutive memory access deltas, where each of the consecutive memory access deltas represents a difference between two memory addresses accessed by an application, updating values in a prefetch training table based on the first set of memory access deltas, and predicting one or more memory addresses for prefetching responsive to a second set of consecutive memory access deltas and based on values in the prefetch training table.

20 Claims, 12 Drawing Sheets

(56) References Cited

U.S. PATENT DOCUMENTS

2020/0125493 A1 4/2020 Bent
2021/0157730 A1* 5/2021 Hornung ............. G06F 12/0862

OTHER PUBLICATIONS

U.S. Appl. No. 16/927,786 , "Notice of Allowance", U.S. Appl. No. 16/927,786, Jan. 19, 2023, 11 pages.
Ainsworth, Sam , et al., "Graph Prefetching Using Data Structure Knowledge", Proceedings of the 2016 International Conference on Supercomputing [retrieved Jul. 12, 2023]. Retrieved from the Internet <https://www.cl.cam.ac.uk/~tmj32/papers/docs/ainsworth16-ics.pdf>., Jun. 1, 2016, 11 Pages.
Bhatia, Eshan , "Perception-based prefetch filtering", ACM/IEEE 46th Annual International Symposium on Computer Architecture [retrieved Jul. 12, 2023]. Retrieved from the Internet <https://people.engr.tamu.edu/djimenez/pdfs/ppf_isca2019.pdf>., Jun. 2019, 13 Pages.
Kim, Jinchun , et al., "Path confidence based lookahead prefetching", 49th Annual IEEE/ACM International Symposium on Microarchitecture (MICRO) [retrieved Jul. 12, 2023]. Retrieved from the Internet <https://web.archive.org/web/20170610234814id_/http://cegroup.ece.tamu.edu:80/~pgratz/papers/micro2016_spp.pdf>., Oct. 2016, 12 Pages.
Michaud, Pierre , "Best-offset hardware prefetching", IEEE International Symposium on High Performance Computer Architecture (HPCA) [retrieved Jul. 12, 2023]. Retrieved from the Internet <https://inria.hal.science/hal-01254863/document>., Mar. 2016, 13 Pages.
Nesbit, K.J. , "Data Cache Prefetching Using a Global History Buffer", 10th International Symposium on High Performance Computer Architecture (HPCA'04) [retrieved Jul. 12, 2023]. Retrieved from the Internet <https://www.eecg.utoronto.ca/~steffan/carg/readings/ghb.pdf>., Feb. 2004, 10 Pages.
PCT/US2021/020287 , "International Search Report and Written Opinion, Application No. PCT/US2021/020287", Jul. 26, 2021, 10 Pages.
Peled, Leeor , et al., "A neural network memory prefetcher using semantic locality", Cornell University arXiv, arXiv.org [retrieved Jul. 12, 2023]. Retrieved from the Internet <https://arxiv.org/pdf/1804.00478.pdf>., Jul. 26, 2018, 13 Pages.
Pugsley, Seth H, et al., "Sandbox Prefetching: Safe run-time evaluation of aggressive prefetchers", IEEE 20th International Symposium on High Performance Computer Architecture (HPCA) [retrieved Jul. 12, 2023]. Retrieved from the Internet <http://www.jaleels.org/ajaleel/publications/hpca2014-sandbox.pdf>., Feb. 2014, 12 Pages.
Shevgoor, Manjunath , et al., "Efficiently prefetching complex address patterns", MICRO-48: Proceedings of the 48th International Symposium on Microarchitecture [retrieved Jul. 12, 2023]. Retrieved from the Internet <https://citeseerx.ist.psu.edu/document?repid=rep1&type=pdf&doi=278ff6b3385d04f845edb78be155128d257537fc>., Dec. 5, 2015, 12 Pages.
Somogyi, Stephen , "Spatial Memory Streaming", ACM SIGARCH Computer Architecture News, vol. 34, No. 2 [retrieved Jul. 12, 2023]. Retrieved from the Internet <https://www.eecg.toronto.edu/~moshovos/research/sms.pdf>., 2006, 12 Pages.

* cited by examiner

METHOD AND APPARATUS FOR A PAGE-LOCAL DELTA-BASED PREFETCHER

RELATED APPLICATIONS

This application is a continuation of and claims priority to U.S. patent application Ser. No. 16/927,786, filed Jul. 13, 2020, entitled "Method And Apparatus For A Page-Local Delta-Based Prefetcher", which claims priority to U.S. Provisional Application No. 63/044,468, filed on Jun. 26, 2020, which are incorporated by reference herein in their entireties.

GOVERNMENT RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

A processor in a modern computing system can typically operate much more quickly than a main memory that stores instructions or other data used by the processor. Thus, in many cases a smaller and faster cache memory is used in conjunction with the main memory to provide quick access to the instructions or data. Prefetching of data to the cache occurs when the processor requests data to be stored in the cache before the data is actually needed. Then, when the data is needed, it can be retrieved from the cache without incurring the additional latency of requesting it from the main memory.

Since most programs are executed sequentially or exhibit other regular patterns of execution, instructions or other data can be fetched in program order or according to other identified patterns in the memory access stream. However, prefetching incorrect data, or prefetching data at an inappropriate time can reduce the overall benefit provided by the prefetching implementation.

BRIEF DESCRIPTION OF THE DRAWINGS

The present disclosure is illustrated by way of example, and not by way of limitation, in the figures of the accompanying drawings.

DETAILED DESCRIPTION

Figure 1:
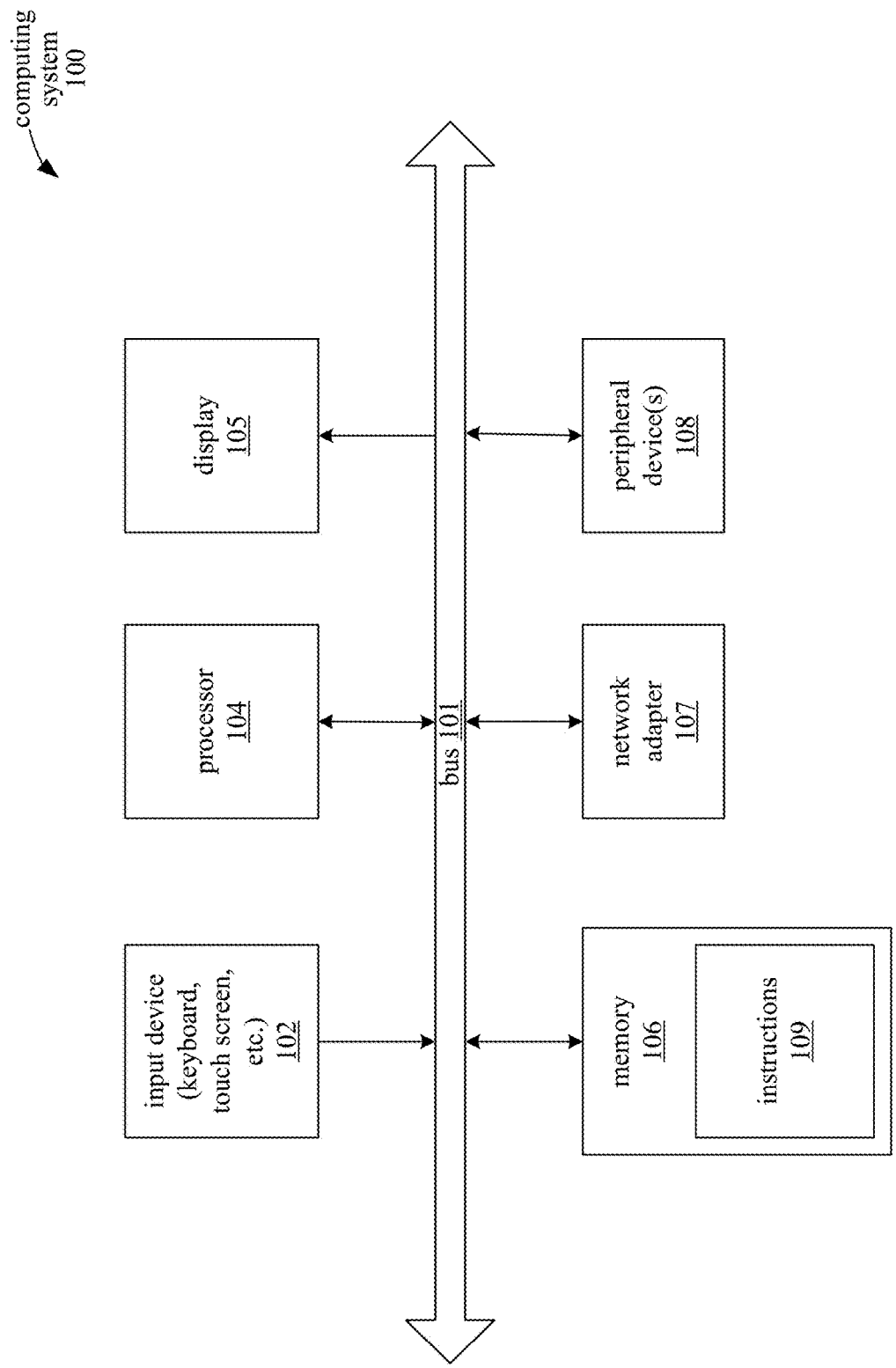
FIG. 1 illustrates a computing system, according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Memory latency is difficult to reduce, and thus represents a significant impediment to the scaling of computer system performance. Data prefetching hides memory latency by speculatively issuing memory requests so that data is moved to a faster cache memory before it is used. However, inaccurate prefetches can cause computing resources to be consumed inefficiently, while still failing to hide memory latency for data that is actually used.

In one embodiment, a delta-based prefetcher exploits the correlation between a repeatable memory access pattern and program meta-data, such as a memory instruction's program counter (PC), to accurately predict future memory access patterns and prefetch data into the cache in a timely fashion. Memory access patterns are represented as sequences of deltas, where a delta is the difference between two consecutively generated memory addresses to the same memory region (e.g., a memory page). The prefetcher tracks memory access patterns per memory region (e.g. 4 KB memory pages) independent of the instructions that generate the memory accesses.

In one embodiment, the prefetcher tracks memory access patterns per memory page, and is thus referred to as a Page-Local Delta-based Prefetcher (PLDP). Delta sequences are recorded per memory region because this address partitioning when searching for patterns in memory traffic provides the highest coverage of memory traffic across a variety of workloads. While the embodiments in the following description operate with 4 KB memory pages, alternative embodiments operate with other region sizes in either the physical or virtual memory address space.

In one embodiment, a Multiple-Distance Correlation data Prefetcher (MDCP) is a delta-based prefetcher that records multiple memory access delta patterns per memory region and predicts future access patterns by, for each current delta value, incrementing weight values corresponding to each of multiple preceding delta values observed and their distances from the current delta value in the delta sequence. Given a current set of delta values, an address for prefetching is predicted by accumulating the weights for each of multiple possible next delta values, where the weights to be accumulated are selected based on the current delta values and their respective distances in the delta sequence from the delta value being predicted.

FIG. 1 illustrates an embodiment of a computing system 100 implementing a delta-based prefetching mechanism. In general, the computing system 100 is embodied as any of a number of different types of devices, including but not limited to a laptop or desktop computer, mobile device, server, network switch or router, etc. The computing system 100 includes a number of hardware resources, including components 102-108, which communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as external peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100. Memory system 106 includes memory devices used by the computing system 100, such as random-access memory (RAM) modules, read-only memory (ROM) modules, hard disks, and other non-transitory computer-readable media.

Computing system 100 includes a processing unit 104. In one embodiment, the processing unit 104 includes multiple processing cores that reside on a common integrated circuit substrate. The processing unit 104 receives and executes instructions 109 that are stored in a memory system 106. At least a portion of the instructions 109 defines an application including instructions that are executable by the processing unit 104.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple processing units 104, buses 101, network adapters 107, memory systems 106, etc.

Figure 2:
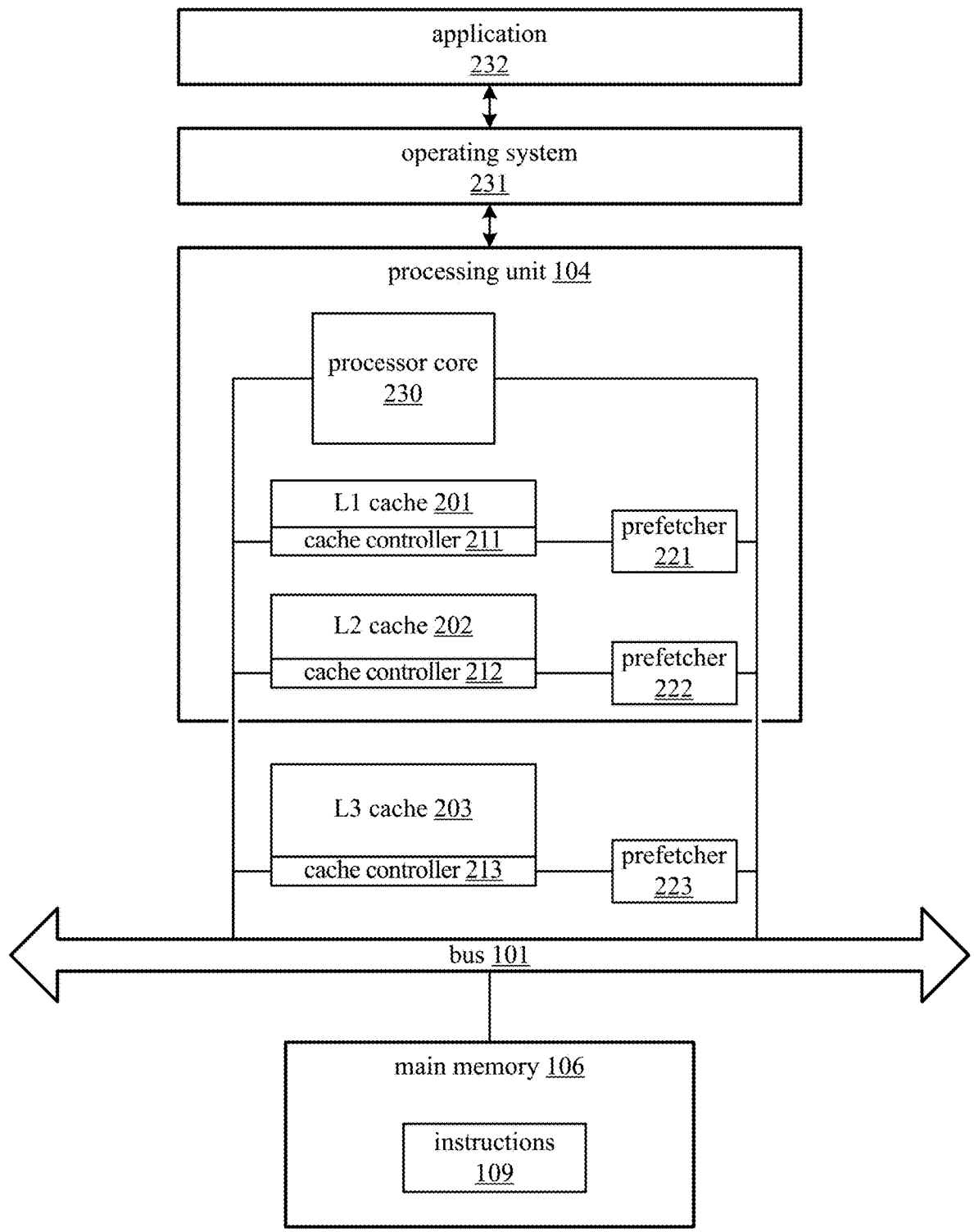
FIG. 2 illustrates a memory hierarchy in a computing system, according to an embodiment.

FIG. 2 illustrates a memory hierarchy in a computing system 100, according to an embodiment. The processing unit 104 includes a cache hierarchy that includes an L1 cache 201, an L2 cache 202, and an L3 cache 203. Other devices, such as the processor core 230, interface with these caches 201-203 via cache controllers 211-213, which control the caches 201-203, respectively. The processor core 230 runs an operating system 231 and a user application 232 by executing instructions 109. In the cache hierarchy, the highest L1 cache 201 is the fastest and smallest capacity cache in the hierarchy. The successive lower caches L2 202 and L3 203 are increasingly slower (i.e., higher latency) and/or larger in capacity.

Hardware prefetchers 221-223 are associated with cache levels 201-203, respectively, and generate prefetch requests for their associated cache levels or cache levels lower than their associated cache levels. The prefetch requests support the execution of application 232 by loading a targeted cache with data or instructions that will be used by the application 232 before it is demanded. In various embodiments, some or all of the prefetchers 221-223 are implemented as delta-based prefetchers that predict future memory addresses for prefetching based on recorded past delta patterns or weight values generated from past delta patterns. In various embodiments, delta-based prefetchers are also used in conjunction with other types of prefetch mechanisms, such as branch prediction or explicit prefetch instructions.

Figure 3:
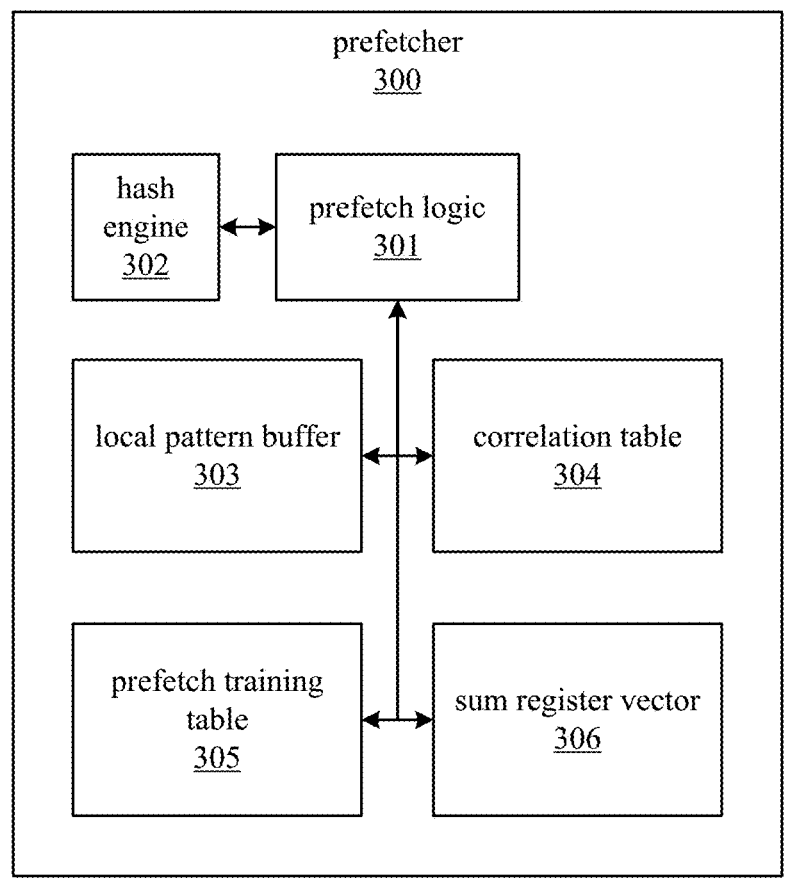
FIG. 3 illustrates components of a delta-based prefetcher, according to an embodiment.

FIG. 3 illustrates an embodiment of a delta-based prefetcher 300. The prefetcher 300 represents any one or more of the prefetchers 221-223, as illustrated in FIG. 2. Computations for prefetch training and prediction are performed by the prefetch logic 301 and hash engine 302. The local pattern buffer 303, correlation table 304, prefetch training table 305, and sum register vector 306 contain data structures used in the training and prediction phases. In one embodiment, the local pattern buffer 303, correlation table 304, prefetch training table 305, and sum register vector 306 are implemented in the main memory 106; alternatively, some or all of these structures can be implemented in one or more dedicated memory devices within the prefetcher 300 or within other components in the computing system 100. The prefetch training table 305 stores prefetch training data that is updated based on the pattern of incoming delta values, and accessed during the prefetch prediction phase to predict future delta values based on the delta pattern history.

During prefetch training, the prefetch logic 301 receives virtual or physical memory addresses that were generated by the processor core 230 while executing the application 232. The prefetch logic 301 calculates a sequence of memory access deltas and stores the sequence in the local pattern buffer 303. The prefetch logic 301 compares the number of deltas recorded in the local pattern buffer 303 to a quantity that is predetermined prior to the prefetch training process. When a sufficient number of deltas has been recorded in the local pattern buffer 303, the prefetch logic 301 updates values in the prefetch training table 305 based on the recorded sequence.

In one embodiment in which the prefetch training table 305 includes a pattern history table, the prefetch logic 301 also updates the correlation table 304 to associate a hash of the current program counter and multiple delta values with an entry in the pattern history table. The hash engine 302 calculates hash values based on program counter and delta values.

In one embodiment, the prefetch training table 305 includes a correlation weight table that stores weight values. The prefetch logic 301 identifies which weight values to increment in the correlation weight table based on the sequence of deltas recorded in the local pattern buffer 303.

The prefetch logic 301 determines when to predict prefetch addresses based on the number of deltas that have been recorded inside local pattern buffer 303. When a sufficient number of deltas has been recorded in the local pattern buffer 303, the prefetch logic 301 selects an entry in the prefetch training table 305 based on the currently recorded sequence of deltas in the local pattern buffer 303.

Using the selected entry from table 305, the prefetch logic 301 predicts one or more memory addresses from which data will be prefetched. In an embodiment where the prefetch training table 305 includes a pattern history table (e.g., PLDP), the selected values are a set of previously recorded delta values that correspond to delta values presently in the local pattern buffer 303.

In an embodiment where the prefetch training table 305 includes a correlation weight table (e.g., MDCP), the selected values are weight values selected based on delta values presently recorded in the local pattern buffer 303. For a next delta value being predicted (i.e., following the most recently recorded delta value in the local pattern buffer 303), prefetch logic 301 selects weight values from a row of the correlation weight table 304 that tracks the correlation between the most recently recorded delta value and any possible future delta values being predicted at a predefined range of distances from the most recently recorded delta value.

The prefetch logic 301 accumulates the weights in a sum register vector 306 by adding the selected weight values for the delta value in respective registers of the sum register vector 306. The index of the register having the highest accumulated weight value represents the most likely next delta, according to the history of observed delta values. This predicted delta is used by the prefetch logic 301 to calculate the next memory address for prefetching.

Figure 4A:
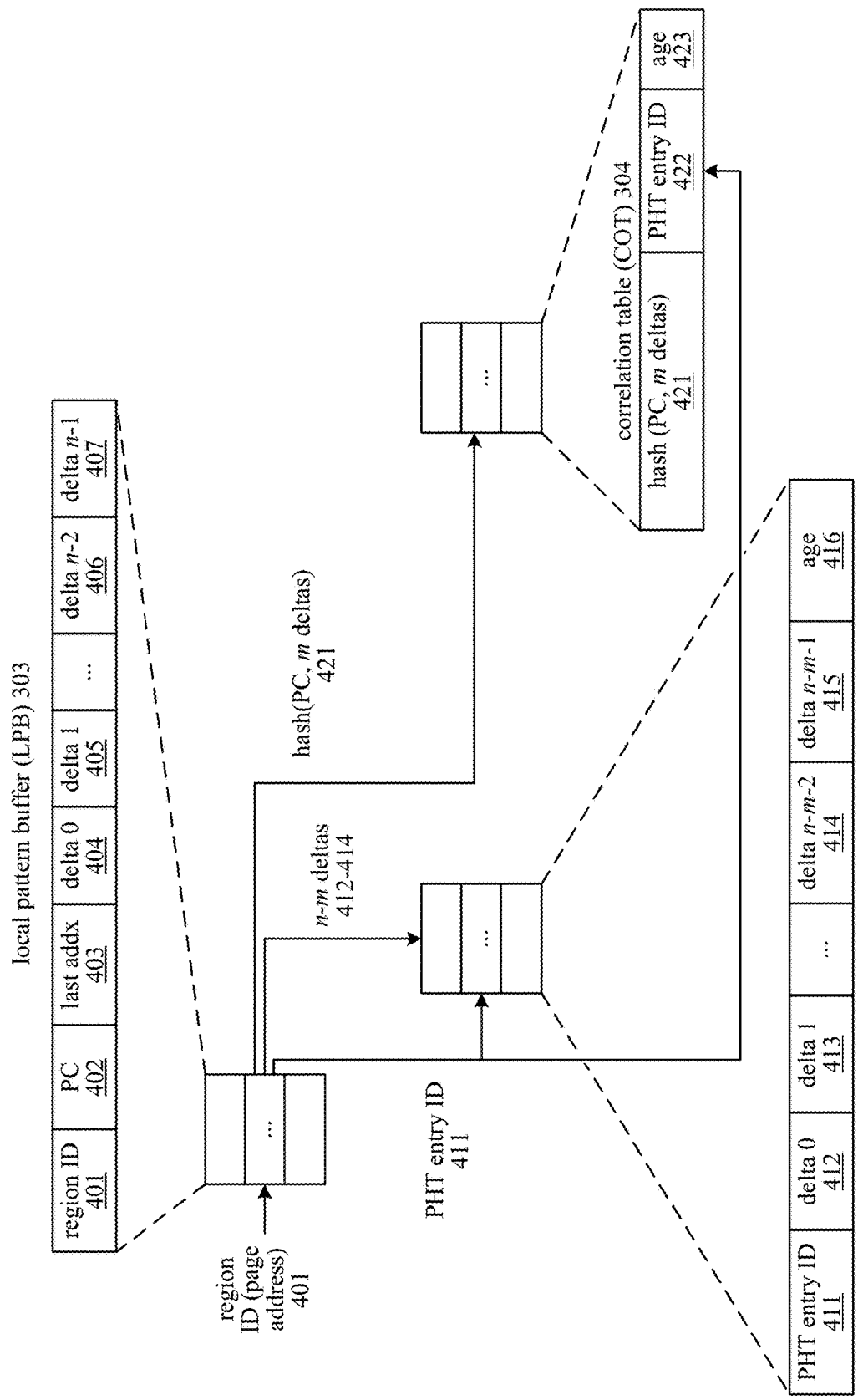
FIG. 4A illustrates data structures used in a training process for a delta-based prefetcher, according to an embodiment.

FIG. 4A illustrates data structures used by the delta-based prefetcher, according to an embodiment. These include the local pattern buffer (LPB) 303, the pattern history table (PHT) 410, and the correlation table (COT) 304. In one embodiment, these structures are implemented in memory in the prefetcher 300; in alternative embodiments, some or all of the structures 303, 304, and 410 reside in one or more other memory devices outside of the prefetcher 300.

Each entry in the LPB 303 includes a memory region identifier 401 (e.g., identifying a 4 KB memory page), a program counter field 402, a memory address 403 most recently accessed in the region, and a sequence of n memory access delta values 404-407 captured in the region, indexed from 0 to n−1. In one embodiment, the region identifier 401 identifies a 4 KB memory page.

Each entry in the PHT 410 includes a sequence of n−m memory access delta values and an age field 416, and is referenced by a PHT entry identifier 411 (e.g., an index value or a hash of the n−m delta values). The PHT 410 saves delta patterns captured by the LPB 303.

Each entry in the COT 304 is referenced using a hash of the program counter 402 and m delta values from the local pattern buffer 303, which is calculated by the hash engine 302. A COT 304 entry also includes a PHT entry identifier 422 for associating the program counter value 402 and m delta values with a sequence of deltas in an entry of the PHT 410. The age field 423 is compared with the age field 416 in the PHT entry identified by the PHT entry ID 422, for determining whether the delta sequence in the PHT entry still corresponds to the correlation table entry containing the PHT entry ID 422.

Figure 4B:
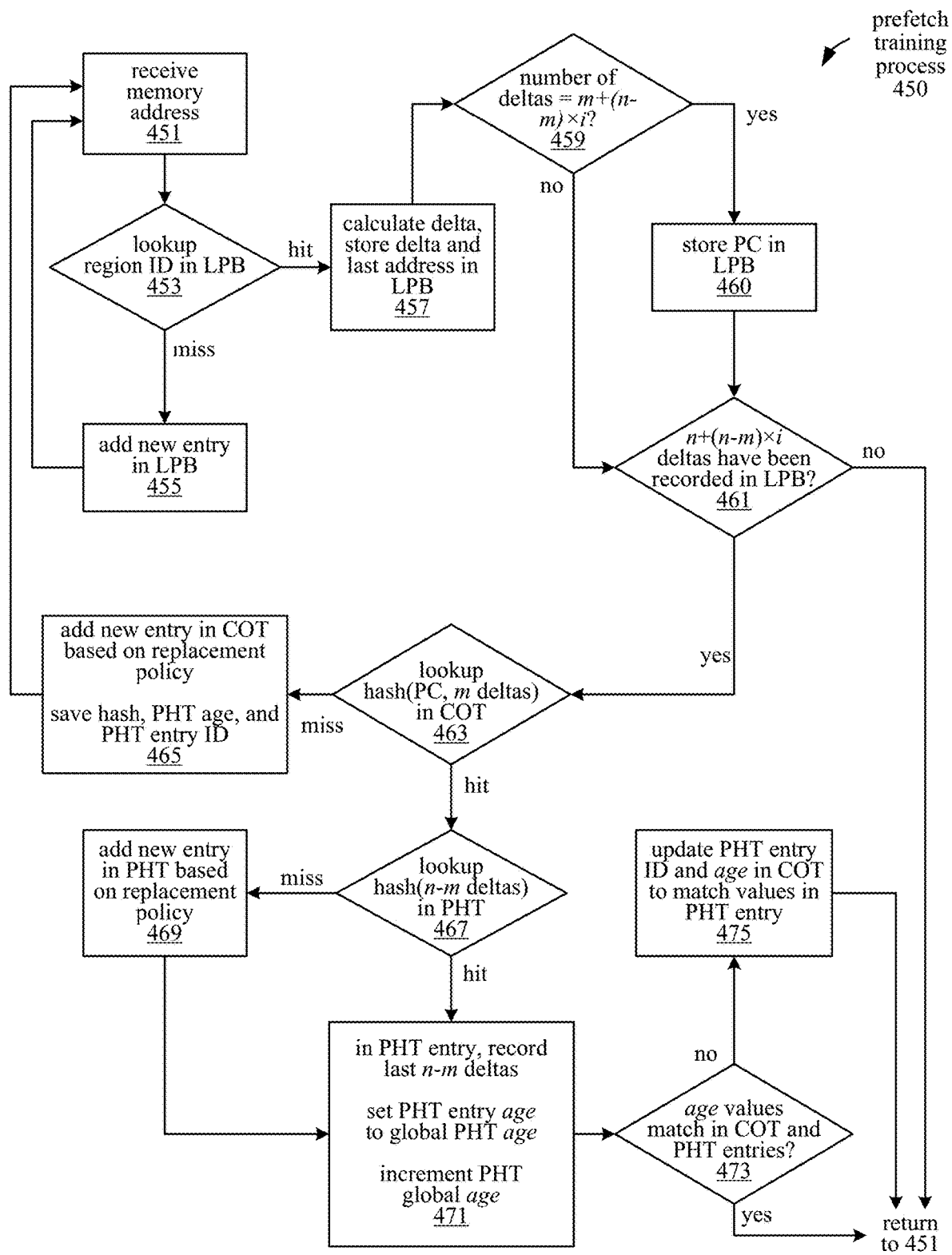
FIG. 4B illustrates a process for training a delta-based prefetcher, according to an embodiment.

FIG. 4B is a flow diagram illustrating a prefetch training process 450 performed by the delta-based prefetcher 300, according to an embodiment. The operations in the process 450 are performed by components of the prefetcher 300, including the prefetch logic 301, hash engine 302, LPB 303, COT 304, and prefetch training table 305.

The prefetcher 300 tracks memory access patterns separately for each memory region (e.g., 4 KB memory page or other region size). In alternative embodiments, the prefetcher 300 tracks memory access patterns globally or according to PC-local classification. Prefetchers performing Global classification track memory access patterns generated by all instructions, targeting the entire memory address space. Prefetchers performing PC-local classification track memory access patterns generated from the same static instruction (i.e., having the same program counter). An example of such a prefetcher is the stride prefetcher that tracks strides of each static load or store instruction.

At block 451, the prefetch logic 301 receives a virtual memory address that is generated by the processor core 230 when executing the application 232 (e.g., a L1 data cache miss demand address). In an alternative embodiment, a physical memory address is used instead of a virtual memory address. The prefetcher 300 performs region-local classification; accordingly, a lookup is performed in the LPB 303 using the region identifier 401. Since the region is a 4 KB memory page, the region ID 401 is the page number address for the received memory address. The region ID 401 is used to perform a lookup in the LPB 303, as provided at block 453.

At block 453, if the region ID 401 lookup results in a miss in the LPB 303, an entry in the LPB 303 is created for the region ID 401, as provided at block 455. If the LPB 303 is full, an existing entry is evicted from the LPB 303 according to a replacement policy. The new entry in the LPB 303 includes the region ID 401, a program counter 402 of the memory instruction originating the access, and the address accessed in the identified memory region. The new entry in the LPB 303 also allocates space for delta values 404-407, which are calculated and stored when future memory accesses occur in the identified region.

After an entry has been created for the region ID 401, lookups of the region ID 401 in the LPB 303 result in a hit. When a hit occurs at block 453, then at block 457 the prefetch logic 301 calculates a delta value from the difference between the new last accessed memory address (received at 451) and the previous last memory address (previously recorded in field 403 of the LPB 303) accessed in the same region. Field 403 is updated to store the new last accessed memory address, and the calculated delta value is stored in the LPB 303 entry for the region as one of the n delta values 404-407. If n delta values have already been recorded, the oldest delta value is overwritten, since n represents a maximum number of deltas that are recorded in each entry of LPB 303. The delta values 404-407 in the LPB 303 thus represent the differences between memory accesses by the application 232 occurring consecutively in the same region (e.g., memory page).

Memory accesses occurring in a different memory region are stored in a different entry in the LPB 303. That is, a sequence of memory accesses in a second 4 KB memory page causes the prefetch logic 301 to create an entry in the LPB 303 for a different region ID (using the page number address of the second memory page) and subsequently populate the delta fields in that entry with a set of memory access deltas calculated from the sequence of memory accesses occurring in the second page.

At block 459, the prefetch logic 301 determines whether the number of deltas recorded in the LPB 303 is equal to m+(n−m)×i, where i is an integer that counts the number of times n deltas has been recorded in the LPB 303 entry, and m is an integer less than n and represents the number of delta values that, along with the instruction program counter 402, will be used to predict the remaining n−m delta values. If the number of deltas recorded in the LPB 303 is not equal to m+(n−m)×i (block 461), then the process 450 returns to block 451. The process 450 thus continues to receive memory addresses being accessed, creating entries in the LPB 303 for each new memory page that is accessed, and recording delta values between consecutive accesses in each memory page in accord with blocks 451-457. When the number of deltas recorded in an LPB entry for a memory page is equal to m+(n−m)×i, the process 450 continues from block 459 to block 460.

At block 460, the prefetch logic 301 stores the memory instruction program counter 402 in the LPB 303. Accordingly, the memory instruction PC 402 is saved in the LPB entry every time the number of deltas recorded in the entry is equal to m+(n−m)×i. Thus, i is incremented every time we record either m deltas (the first time, when i=0) or n deltas (i>0) and corresponds to the number of times the PC 402 has been saved. As an example, if n=5 and m=2, then the first memory instruction PC 402 is saved when the first two deltas have been recorded, when i=0. The next time the memory instruction PC 402 is recorded is after the next 3 deltas are recorded, when i=1, and so on.

At block 461, the prefetch logic 301 determines whether the number of deltas that have been stored in the LPB entry is equal to n+(n−m)×i, where i counts the number of times n deltas has been recorded in the LPB 303 entry. If the number of delta values that have been recorded in the LPB entry is not equal to n+(n−m)×i, the process 450 returns to block 451. In one embodiment, the values of n and m are predetermined prior to the prefetch training process 450.

When the number of delta values that have been recorded in the LPB entry is equal to n+(n−m)×i, the process 450 continues from block 461 to 463. At block 463, the hash engine 302 calculates a hash 421 of the memory instruction PC 402 and m most recently recorded deltas from the LPB 303, and the prefetch logic 301 performs a lookup in the COT 304 using the hash. To predict future memory accesses, the prefetcher 300 continuously observes the sequence of incoming delta values to identify unique signatures that match previously detected patterns; the hash of the PC 402 and m deltas serves as such a signature. Coupling a sub-pattern of m delta values with the memory instruction's PC achieves better accuracy than either a PC or sub-pattern alone. If the lookup results in a miss, the process 450 continues at block 465, and a new entry is added in the COT 304. If the COT 304 is full, an entry is evicted based on a replacement policy. The hash, PHT age 416, and the PHT entry ID 411 are stored in the hash 421, PHT entry ID 422, and age 423 fields, respectively, in the COT 304. From block 465, the process 450 returns to block 451.

At block 463, if the lookup of the hash in the COT 304 results in a hit, the process 450 continues at block 467. At block 467, the hash engine 302 calculates a hash of the most recently saved n−m delta values in the LPB 303, and the prefetch logic 301 performs a lookup of the hash in the prefetch training table 305, which is implemented as PHT 410. If the lookup results in a miss, then at block 469, the prefetch logic 301 adds a new entry to the PHT 410. If the PHT 410 is full, an entry is evicted based on a replacement policy. At block 471, the most recently saved n−m delta values in the LPB 303 are copied into the new entry in the PHT 410. A global PHT age value (e.g., an integer counter value) is stored in the age field 416 of the entry, and the global PHT age is incremented. If the lookup at block 467 results in a hit, the process 450 continues at block 471 without performing the operations of block 469.

At block 473, the PHT entry ID 422 and the age 423 values of the matching entry in the COT 304 are checked to determine whether they match the PHT entry ID 411 and age 416, respectively, of the entry in the PHT 410. If the values do not match, then at block 475, the prefetch logic 301 updates the values 422 and 423 in the COT 304 entry to match their corresponding values 411 and 416 in the PHT 410 entry. The process 450 returns to block 451 from block 475. If the values in the COT 304 entry and the PHT 410 entry already match, then the process 450 returns to block 451 from block 473 without changing the entry in the COT 304. Blocks 451-475 thus repeat to update the LPB 303, PHT 410, and COT 304 with prefetch training data based on incoming memory access deltas while the application 232 is being executed.

In an example illustrating the training process 450, a sequence of deltas A, B, C, D, E, F, and G is calculated from a sequence of memory accesses in the same memory page. In this example, n=5 and m=2. Accordingly, when A and B are recorded (per block 457) in the LPB 303, block 459 evaluates as true and the PC of the memory instruction x is saved in the PC field 402 of the LPB 303 so that (A, B, x) can eventually be correlated with the remaining 3 deltas (C, D, E) of the n deltas to be saved in the LPB 303. The next memory instruction PC, y, is saved after the deltas (C, D, E) have been recorded in the LPB 303. Thus, (D, E, y) can be correlated with the next 3 deltas (F, G, H). Recording the memory instruction PCs x and y reduces redundancy in the prefetch stream because next time the same deltas are recorded, the prefetcher 300 is able to predict (C, D, E) upon observing (A, B, x), and predict (F, G, H) upon observing (D, E, y).

Figure 5A:
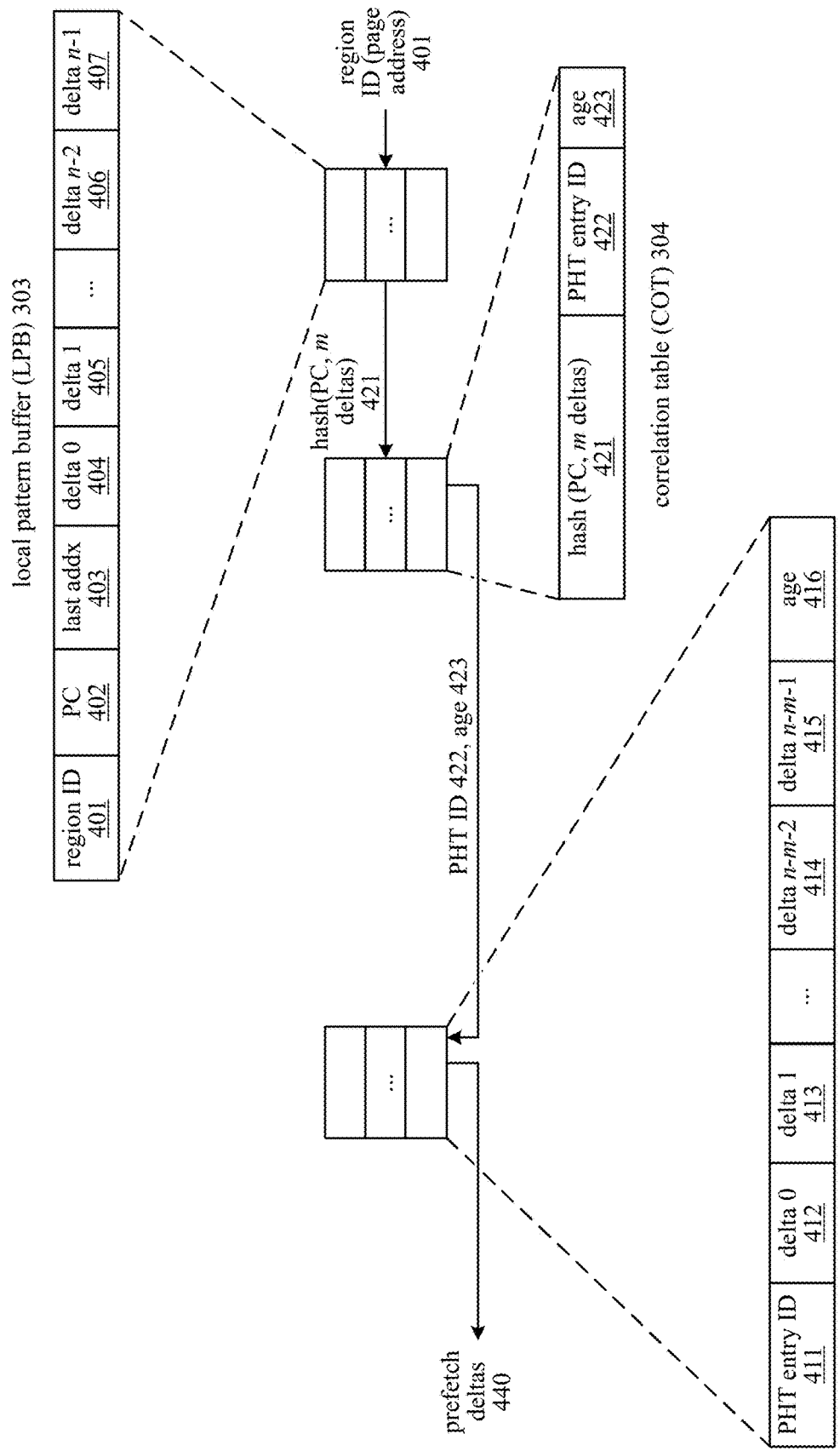
FIG. 5A illustrates data structures used in a prefetch prediction process for a delta-based prefetcher, according to an embodiment.

FIG. 5A is a block diagram illustrating the flow of information between the LPB 303, COT 304, and the PHT 410 when prefetch prediction is performed, according to an embodiment. An incoming region ID 401 (e.g., a page address) is used to lookup an entry in the LPB 303 and, if sufficient pattern information has been recorded, obtain a sequence of predicted delta values 440 from the PHT 410, which are in turn used to calculate one or more addresses for prefetching.

Figure 5B:
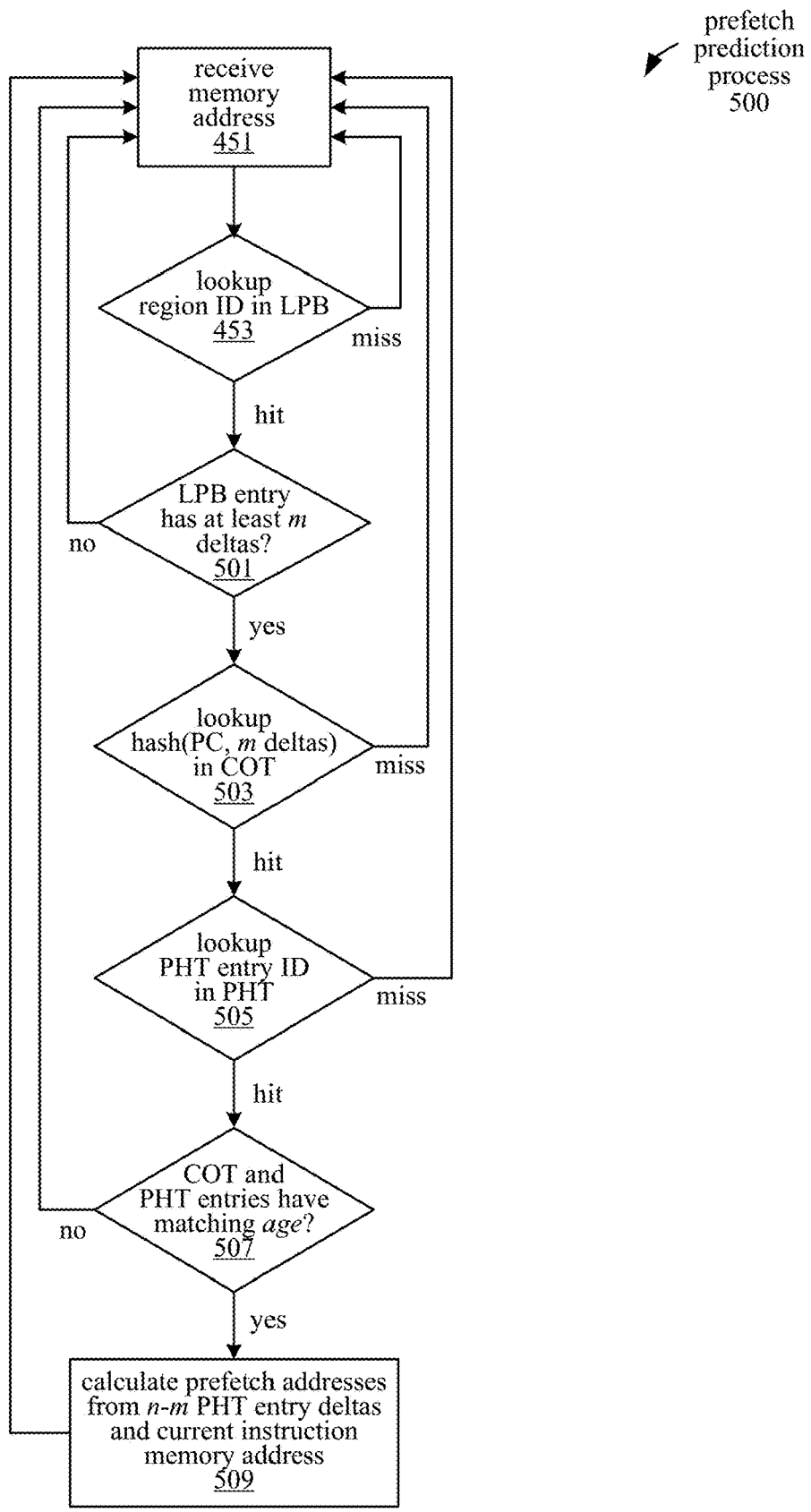
FIG. 5B illustrates a prefetch prediction process performed by a delta-based prefetcher, according to an embodiment.

An embodiment of this prefetch prediction process is described in further detail with reference to FIG. 5B. The operations of the prefetch prediction process 500 are performed by components of the prefetcher 300, including the prefetch logic 301, hash engine 302, LPB 303, COT 304, and prefetch training table 305. Process 500 is performed at the same time as process 450; accordingly, identically numbered operations are similar or shared between the processes 450 and 500.

At block 451, when the processor core 230 accesses a memory address according to a memory instruction of the application 232, the prefetch logic 301 receives the accessed virtual or physical memory address. At block 453, the prefetch logic 301 performs a lookup of the region ID 401 (e.g., the page address of the received memory address) in the LPB 303. At block 453, if the lookup results in a miss, then the process 500 returns to block 451. If the lookup results in a hit, the process 500 continues at block 501.

At block 501, if the matching entry in the LPB 303 does not have at least m delta values, the process 500 returns to block 451. If the entry has at least m deltas, the process 500 continues at block 503. According to the previous example in which m=2, the process 500 continues at block 503 when the number of deltas in the LPB 303 is at least 2.

At block 503, the hash engine 302 calculates a hash of the PC 402 of a memory instruction associated with the most recent memory access and the m delta values. The prefetch logic 301 performs a lookup of the hash in the COT 304. If the lookup results in a miss, the process 500 returns to block 451. If the lookup results in a hit, then the PHT entry ID 422 and age 423 are obtained from the matching entry of the COT 304.

At block 505, the prefetch logic 301 performs a lookup of the PHT entry ID 422 in the PHT 410. If the lookup results in a miss, the process 500 returns to block 451. If the lookup results in a hit, the process 500 continues at block 507. At block 507, the prefetch logic 301 compares the age value 423 from the COT 304 entry with the age value 416 from the matching PHT 410 entry. If the age entries 423 and 416 do not match, the process 500 returns to block 451. Differing age values 423 and 416 indicate that the PHT entry is no longer associated with the COT 304 entry (e.g., if the PHT 410 entry were subsequently overwritten with a newer delta sequence and associated with a different entry in the COT 304). If the age entries 423 and 416 match, the process 500 continues at block 509.

At block 509, the n−m deltas 412-415 in the PHT 410 entry and the address of the most recent memory access are used to calculate n−m addresses for prefetching. The n−m prefetch requests are then issued to the memory system for the calculated addresses. The n−m addresses for prefetching are calculated sequentially, since each of the delta values is calculated based on the previous memory address. From block 509, the process 500 returns to block 451. The process 500 thus repeats during execution of the application 232 to determine for each memory access whether the most recent pattern of delta values matches a previously recorded pattern, and to predict addresses for prefetching based on the matching pattern.

Figure 6A:
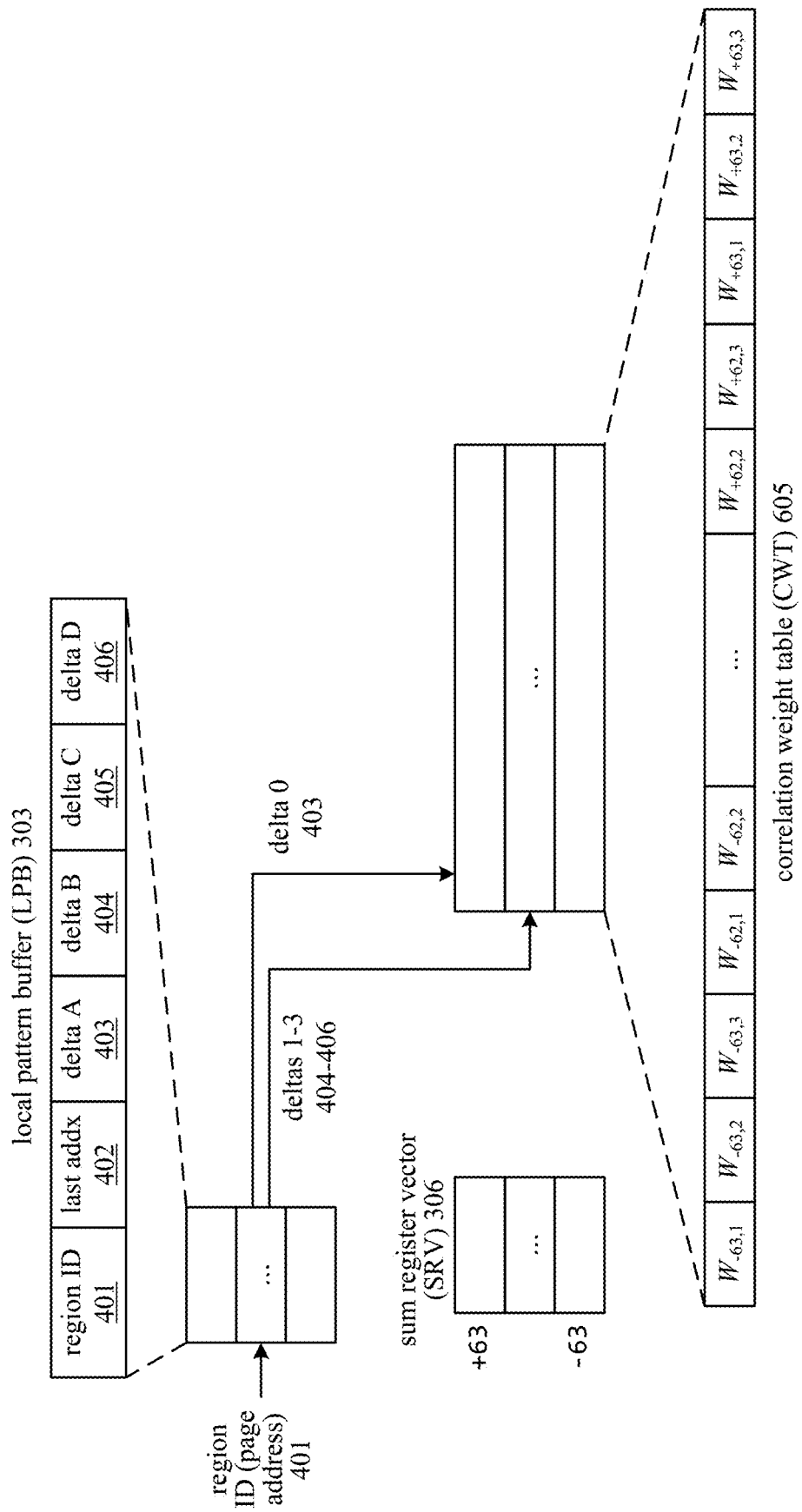
FIG. 6A illustrates data structures used in a training process for a delta-based prefetcher, according to an embodiment.

FIG. 6A illustrates data structures used by a delta-based prefetcher 300, according to an embodiment, in which the prefetch training table 305 is implemented as a correlation weight table (CWT) 605 that stores weights for observed delta patterns. In one embodiment, these structures are implemented in memory in the prefetcher 300; in alternative embodiments, some or all of the structures 303, 306, and 605 reside in one or more other memory devices outside of the prefetcher 300.

The prefetcher 300 uses the CWT 605 tracks the correlation between future memory access delta candidates in the region (e.g., memory page) and the region-local delta pattern most recently observed. The correlation is represented as weights each representing how strongly each delta in the region-local delta pattern correlates with each future access delta candidate.

As previously described, the LPB 303 contains multiple entries, each including a region identifier 401, the last memory address 402 accessed in the identified region, and a set of n+1 memory access delta values captured in the region. Lookups in the LPB 303 are performed using the region ID 401, such as a page identifier of a cache miss demand request address.

The CWT 605 as illustrated in FIG. 6A operates with a 64B cache line and using a 4 KB memory page as the region size. Each region thus contains 4096/64=64 cache lines, so the range of possible values for deltas in the region is from −63 to +63. There are therefore 126 future access delta candidates in a region. Future memory access deltas are predicted using a n-delta region-local pattern. The CWT 605 is illustrated for n=3. Given a pattern of 3 deltas A, B, and C in LPB 303, the prefetcher 300 reads 3×126 weights, where each of the weights represents a correlation between one of the deltas A, B, and C and one of the 126 future delta candidates. The delta candidate having the strongest correlation with A, B, and C is selected as a predicted future delta, to be used for calculating an address for prefetching.

The weights stored in the CWT 605 are organized into 126 rows, with each row consisting of n×126 weights, organized in 126 columns. Each CWT entry consists of n weights. A group of n weights captures the correlation between a future delta candidate (represented by the column index) and the current delta (represented by the row index) when the current delta is captured j deltas before the future delta, where $1 \leq j \leq n$. Each row of weights is designated as $\{W_{i,j} | -63 \leq i \leq +63$ and $i \neq 0$ and $1 \leq j \leq n\}$, where i is the future delta (CWT column index) and j is the distance between the current delta (CWT row index) and the future delta. For example, $W_{-5, 2}$ represents the row of weights indicating the degree of correlation between a delta −5 and all deltas captured two deltas before the delta −5. The SRV 306 includes 126 registers, designated as $\{S_i | -63 \leq i \leq +63$ and $i \neq 0\}$. Each register of the SRV 306 accumulates weight values for one of the 126 possible future delta candidates.

Figure 6B:
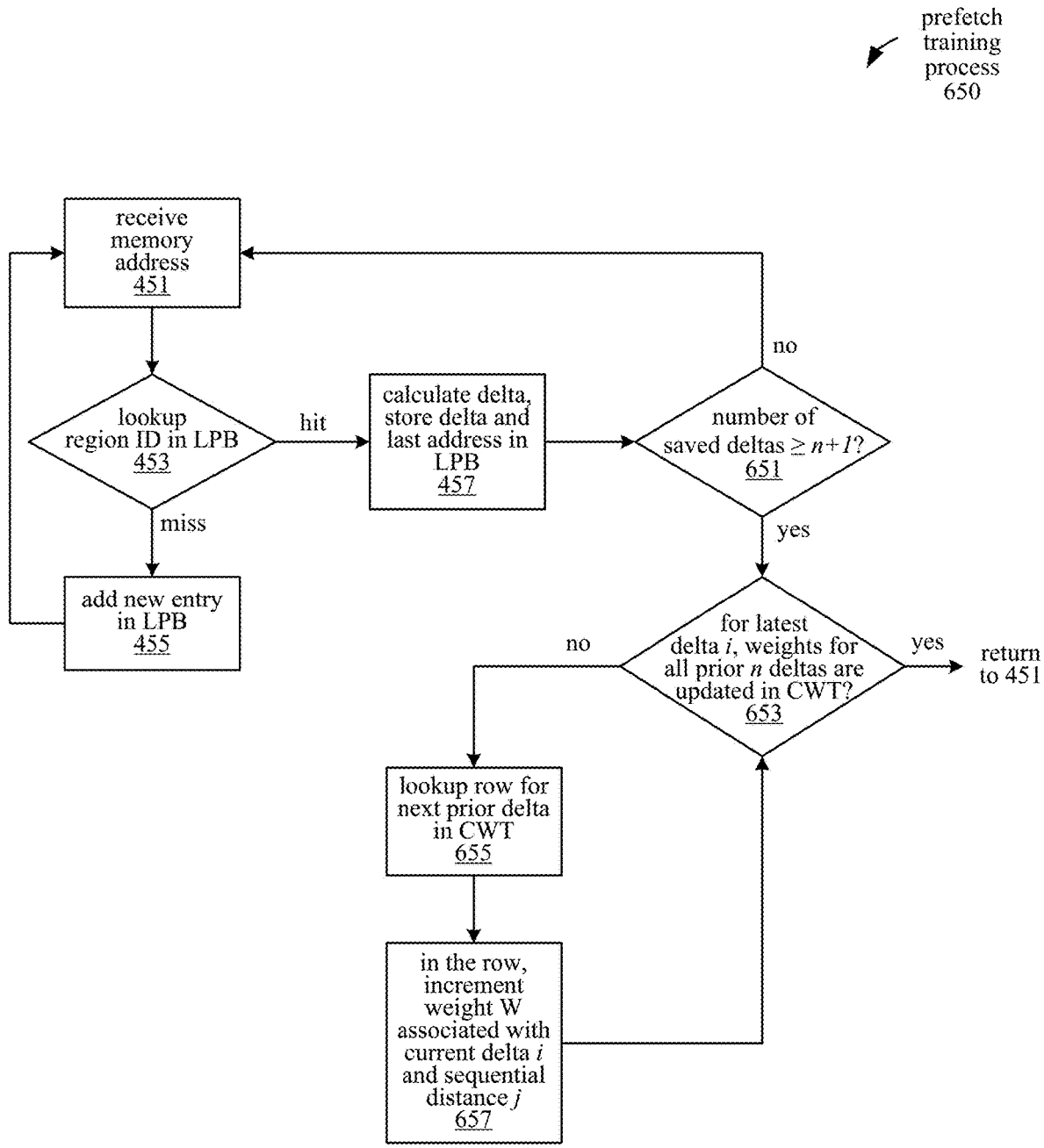
FIG. 6B illustrates a process for training a delta-based prefetcher, according to an embodiment.

FIG. 6B is a flow diagram illustrating a prefetch training process 650 performed by the delta-based prefetcher 300, according to an embodiment. The operations in the process 650 are performed by components of the prefetcher 300, including the prefetch logic 301, LPB 303, prefetch training table 305, and sum register vector 306.

At block 451, the prefetch logic 301 receives the address of a memory access by the processor core 230 and looks up the region ID 401 (e.g., the page address) of the received memory address in the LPB 303, as provided at block 453. If the lookup results in a miss, then a new entry is allocated in the LPB 303, as provided at block 455, and the received address is saved as the last address 402 in the LPB 303. From block 455, the process 650 returns to block 451 to receive the next accessed memory address. At block 453, if the lookup results in a hit, then the process 650 continues at block 457. At block 457, the prefetch logic 301 calculates a delta between the received memory address and the previously recorded last address 402 in the LPB 303. The new delta value is recorded in the LPB 303 entry in an unused one of the delta fields 403-406, or overwriting the oldest delta in 403-406. The address received at block 451 is recorded as the last address 402.

At block 651, if the number of saved delta values in the LPB 303 entry is not greater than or equal to n+1, then the process 650 returns to block 451. The parameter n represents the length of the delta pattern for which weights are updated for each future access delta candidate. In one embodiment, the value of n is predetermined prior to the prefetch training process 650. As illustrated in FIG. 6A, the value of n is 3; however, n can have different values in alternative embodiments. The LPB 303 entry includes n+1 fields 403-406 for storing delta values. At block 651, if the number of saved delta values in the LPB 303 entry is greater than or equal to n+1, then a sufficient number of delta values have been recorded in the LPB 303, and the process 650 continues at block 653.

Blocks 653-657 are performed for each of the subset of n delta values (e.g., deltas A-C) recorded in the LPB 303 prior to the most recent delta value (e.g., delta 3) to update the weights $W_{i,j}$ corresponding to the most recent delta value and to each of the preceding delta values. In $W_{i,j}$, i represents the most recent delta value and j represents the sequential distance of the preceding delta value from the most recent delta value. At block 653, if not all of these weights have been updated, the process 650 continues at block 655. At block 655, the prefetch logic 300 performs a lookup in the CWT 605 to find a row corresponding to the next preceding delta (e.g., delta A, B, or C).

In the row corresponding to the prior delta, the weight $W_{i,j}$ is located in subcolumn j of column i and is incremented by 1, as provided at block 657. Column i contains the weights associated with the most recent delta value, and subcolumn j is associated with the distance j from the most recent delta value in the delta sequence. In alternative embodiments, weights are incremented by an integer or non-integer amount other than 1. From block 657, the process 650 returns to block 653 to continue updating weights for the remaining prior delta values. While the operations in blocks 653-657 are illustrated as sequential, these operations are performed in parallel in alternative embodiments.

As an example, if n=3 and the delta values in the LPB 303 entry are A, B, C, and D (with D being the most recently saved delta), the rows corresponding to A, B, and C are looked up in the CWT 605. In the CWT 605 row corresponding to A, the weight $W_{D,3}$ is incremented in column D and subcolumn 3 (since A is the third delta prior to D). In the row corresponding to B, the weight $W_{D,2}$ is incremented in column D and subcolumn 2. In the row corresponding to C, the weight $W_{D,1}$ is incremented in column D and subcolumn 1. Each weight value is implemented by a c-bit counter. If the weight to be incremented is saturated, weights in the same subcolumn of all other columns in the same row are decremented. For instance, in the row corresponding to C in the abovementioned example, if the weight $W_{D,3}$ is saturated, all the weights $W_{i,3}$ ($-63 \leq i \leq +63$, $i \neq 0$, and $i \neq D$) in the row are decremented. When all of the weights have been updated, the process 650 returns from block 653 to block 451. The process 650 thus repeats to update weights for each incoming delta value based on their preceding n delta values.

Figure 6C:
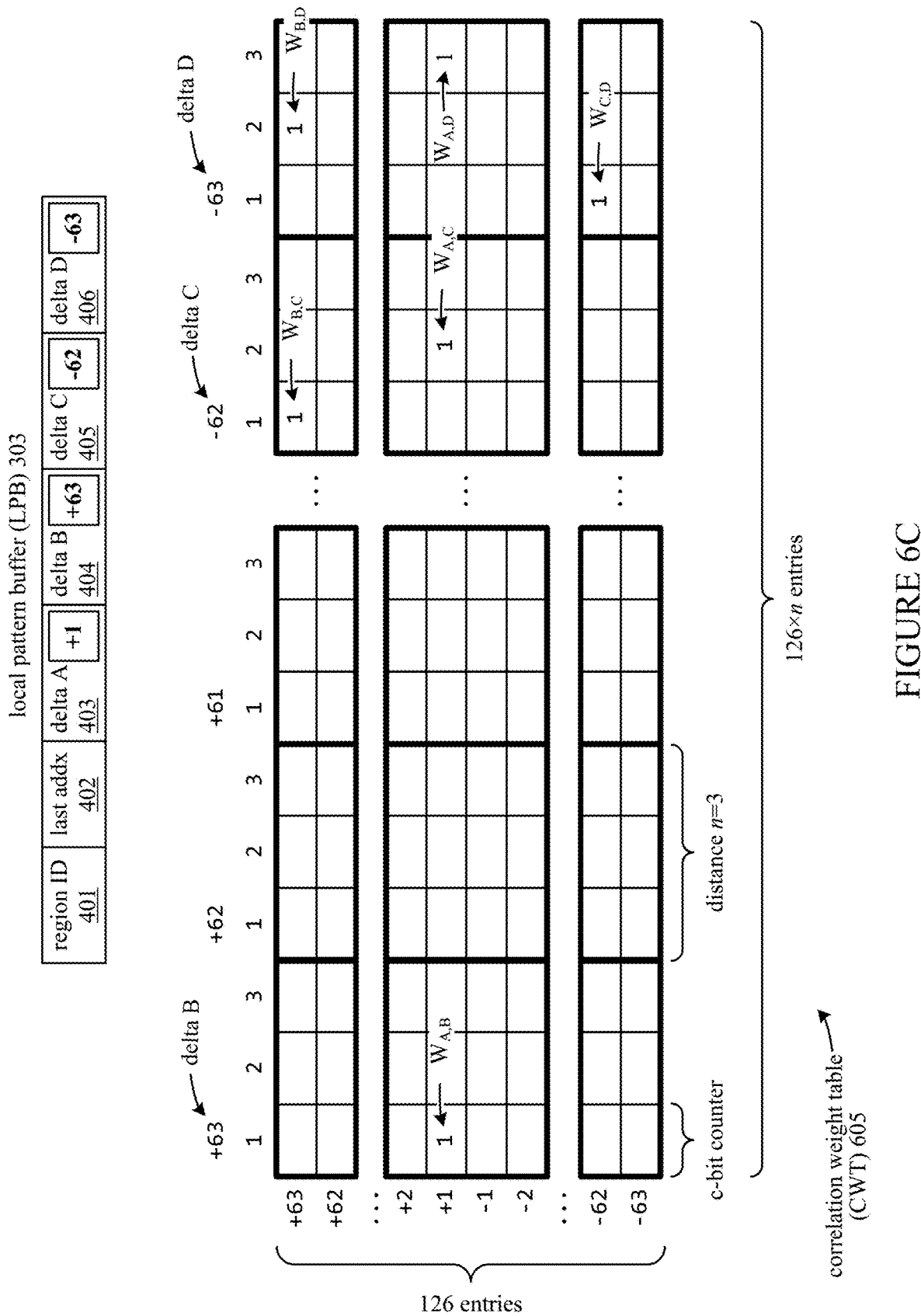
FIG. 6C illustrates incrementing weights in a correlation weight table, according to an embodiment.

FIG. 6C illustrates the incrementing of weights for a delta in accord with blocks 653-657, according to an embodiment. As shown in FIG. 6C, the delta values A, B, C, and D are stored in the LPB 303 in respective order, with D being the most recently recorded delta value. These delta values are +1, +63, −62, and −63, respectively.

The third prior delta value is A, with a value of +1; accordingly, the row corresponding to +1 is looked up in the CWT 605. In the '+1' row, the weight $W_{A,D}$ to be incremented is located in the column corresponding to '−63', which is the value of D. The weight $W_{A,D}$ is in the third subcolumn, since A is the third delta value prior to D in the sequence.

The second prior delta value is B, with a value of +63; thus, the corresponding weight $W_{B,D}$ is found in the '+63' row (corresponding to B) and the '−63' column (corresponding to D). The weight $W_{B,D}$ is in the second subcolumn, since B is the second delta value prior to D in the sequence. Similarly, the first prior delta is C with a value of −62; thus, the corresponding weight $W_{C,D}$ is found in the '−62' row, the '−63' column, and the first subcolumn, since C is the first delta value prior to D in the sequence.

For the sake of further illustration, FIG. 6C also shows the weights $W_{B,C}$ and $W_{A,C}$ that were previously incremented at the time when C was the most recent delta value and A and B are the last two of the three prior delta values. A third weight in column '−62' and subcolumn 3, which is not illustrated, would also be incremented for a delta recorded prior to A.

The weight value $W_{A,B}$ is incremented when B is the most recent delta value and A is the first of the three prior delta values. Weights corresponding to the second and third prior delta values, which are not illustrated, are also incremented in '+63' column and subcolumns 2 and 3, respectively.

Figure 7A:
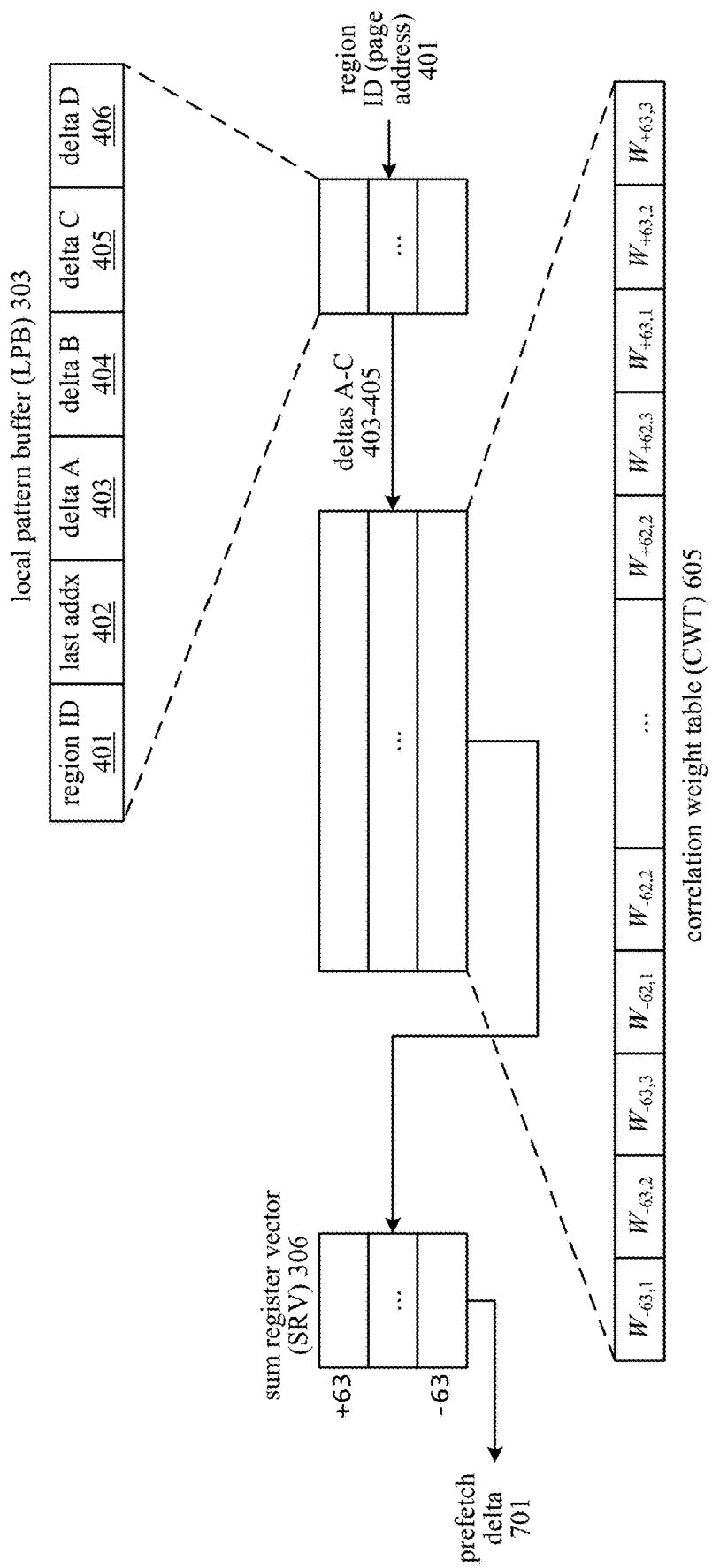
FIG. 7A illustrates data structures used in a prefetch prediction process for a delta-based prefetcher, according to an embodiment.

FIG. 7A illustrates the use of LPB 303, CWT 605, and SRV 306 by the delta-based prefetcher 300 to determine a future access delta 701 for prefetching, according to an embodiment. In the prefetch prediction process 750, an incoming region ID 401 (e.g., a page address) is used to lookup an entry in the LPB 303 and, if sufficient pattern information has been recorded in the entry, calculate an accumulated weight value for each possible future delta candidate based on weights obtained from the CWT 605. The future delta candidate 701 having the highest accumulated weight (indicating the strongest correlation with the most recently recorded delta values) is used to calculate a next memory address for prefetching.

Figure 7B:
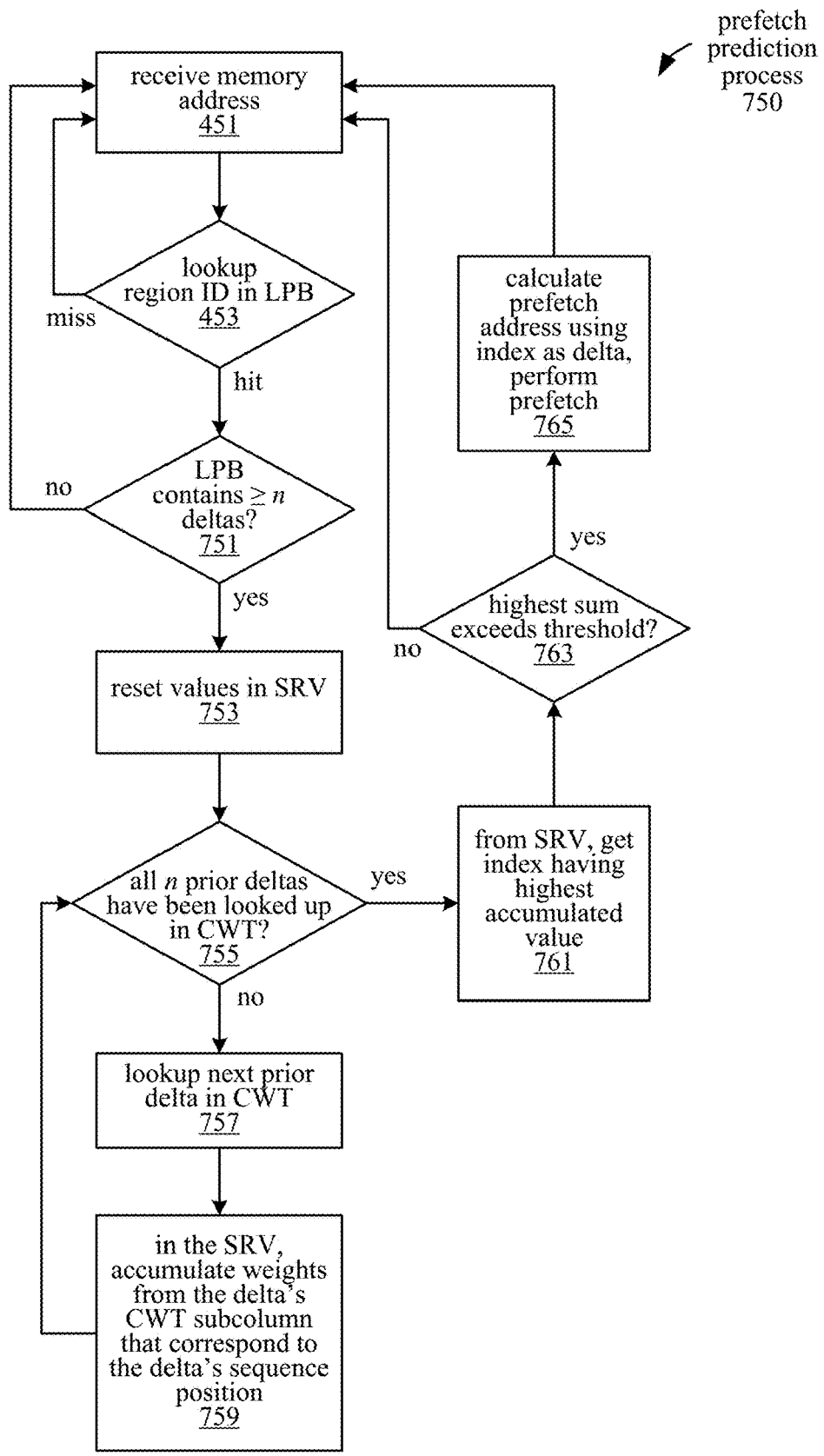
FIG. 7B illustrates a prefetch prediction process performed by a delta-based prefetcher, according to an embodiment.

FIG. 7B illustrates the prefetch prediction process 750, according to an embodiment. The process 750 begins at block 451. At block 451, a new physical or virtual memory address being accessed is sent to the prefetcher 300. At block 453, the region ID 401 (e.g., the page address of the received memory address) is used to perform a lookup in the LPB 303. If the lookup results in a miss, the prediction is not performed and the process 750 returns to block 451. If the lookup results in a hit, the process 750 continues at block 751. At block 751, if the LPB 303 does not contain at least n delta values, then the prediction is not performed and the process 750 returns to block 451. However, if the LPB 303 already contains at least n delta values, then all of the values $\{S_i | -63 \leq i \leq +63 \text{ and } i \neq 0\}$ in the SRV 306 are reset to zero, as provided at block 753.

Blocks 755-759 are repeated to lookup a set of weight values in the CWT 605 for each of the n prior delta values. At block 755, if all of the n prior delta values have not yet been looked up in the CWT 605, then the prefetch logic 301 looks up the next prior delta (e.g., delta A 403) to identify a set of weight values for the prior delta, as provided at block 757. The set of weight values is read from the CWT 605 row associated with the prior delta value and the subcolumn corresponding to the distance in the delta sequence between the prior delta value and the future delta value being predicted. For example, a lookup of delta A in the CWT 605 identifies the set of 126 weights in subcolumn 3 across all columns in the row corresponding to A.

At block 759, each of the 126 weights in the identified set is added to the value in a corresponding one of the 126 registers in the SRV 306. From block 759, the process 750 returns to block 755 to continue identifying and accumulating weights for the next prior delta values.

As an example, if n=3 and the delta values A, B, and C are saved in the LPB 303 entry, with C being the most recently saved delta value, then each of A, B, and C are looked up in the CWT 605 to predict the next future delta value 701. When the CWT 605 is looked up by A, the SRV is updated as follows: $\{S_i = S_i + W_{i,3} | -63 \leq i \leq +63 \text{ and } i \neq 0\}$. The register $S_i$ is increased by $W_{i,3}$, since $W_{i,3}$ represents the correlation between A and a future access delta candidate i that is three delta values subsequent to A.

When the CWT 605 is looked-up by B, the SRV 306 values are updated as follows: $\{S_i = S_i + W_{i,2} | -63 \leq i \leq +63 \text{ and } i \neq 0\}$, since B is two delta values prior to the future delta value 701 being predicted. When the CWT 605 is looked up by C, the SRV 306 values are updated as follows: $\{S_i = S_i + W_{i,1} | -63 \leq i \leq +63 \text{ and } i \neq 0\}$, since C is a delta value immediately prior to the future delta 701. When all of the sets of weight values for each of the n prior delta values have been accumulated in the SRV 306, the process 755 continues from block 755 to block 761.

At block 761, the prefetch logic 301 identifies a register in the SRV 306 having the highest accumulated value. The index of this highest valued register is selected as the most likely future access delta 701. For example, if the register $S_{-10}$ in the SRV 306 has the highest value across $\{S_i|-63\le i\le+63$ and $i\ne 0\}$, then +10 is the predicted next delta value 701. If the highest accumulated weight value in the SRV 306 does not exceed a minimum accumulated weight threshold, then at 763 no prefetch is performed and the process 750 returns to block 451. If the highest accumulated weight value does exceed the minimum accumulated weight threshold, then at block 765, the prefetch logic 301 calculates an address for prefetching by adding the most likely future access delta 701 (i.e., the index of the highest valued register in the SRV 306) to the most recently accessed memory address 402. A prefetch request is issued for the calculated prefetch address.

In one embodiment, the prefetch logic 301 generates more than one prefetch request by recursively accessing the CWT 605 one or more times according to the process 750 using successive predicted delta values in place of the most recent delta value in the LPB 303. For example, if n=3 and the prior delta values saved in the LPB 303 entry are A, B, and C (with C being the most recent delta), the CWT is first accessed by these deltas A, B, and C to predict a future access delta X. Then, B, C, and X are used to continue prefetch request generation by predicting a future delta value that follows X. This process continues to generate multiple addresses for prefetching, and a prefetch request is generated for each of the predicted addresses.

In one embodiment, the prefetch logic 301 updates weights in the CWT 605 based on whether the weights successfully predict addresses for prefetching. If prefetched data is evicted from the cache before it is used, then each set of weights used to generate the prefetch are decremented in the CWT 605. In one embodiment, the prefetch logic 301 uses feedback from the LPB 303 to validate previous predictions and re-train the CWT 605. An entry in the LPB 303 is extended to include additional buffers for storing deltas that were previously predicted for the page corresponding to the LPB entry. When the LPB entry receives a new virtual or physical memory address, the delta between the new address and the address in the LPB entry is calculated and compared with the previously saved delta. If the deltas mismatch, the CWT 605 is accessed by the deltas used to predict the mispredicted delta and decrement the weights corresponding to the mispredicted delta.

For example, if assuming n=3, the deltas saved in the LPB entry are A, B, and C (with C being the most recently saved delta), and the previously predicted delta is X. If a new address is sent to the LPB entry and the calculated delta is Y, then the CWT 605 is accessed by A, B, and C, and the weights representing the correlation between these deltas and X are decremented.

In one embodiment, the minimum accumulated weight threshold (as shown in block 763) is fixed at design time; alternatively, the threshold is changed dynamically at execution time based on the misprediction feedback mechanism described above. If a misprediction is detected, the threshold is incremented to make the prefetcher less aggressive. Otherwise the threshold is decremented to make it more aggressive.

A method includes, in a local pattern buffer, recording a first set of consecutive memory access deltas, where each of the consecutive memory access deltas represents a difference between two memory addresses accessed by an application, in response to determining that the first set of memory access deltas includes a predetermined quantity of memory access deltas, updating values in a prefetch training table based on the first set of memory access deltas and selecting the values from the prefetch training table based on a second set of consecutive memory access deltas received in the local pattern buffer, and based on the selected values, predicting one or more memory addresses for prefetching.

The method also includes, in a correlation table, associating a program counter with a first subset of the consecutive deltas in response to determining that a first entry of the local pattern buffer contains at least m+(n−m)×i memory access deltas, where m<n, and i is an integer greater than or equal to 0.

In the method, the prefetch training table is a pattern history table, and updating the values in the prefetch training table includes copying a first subset of the consecutive memory access deltas from the local pattern buffer to the pattern history table.

The method also includes calculating each of the first set of memory access deltas based on memory addresses located in a first memory page, calculating each of a second set of memory access deltas based on memory addresses located in a second memory page, and storing the first set of memory access deltas and the second set of memory access deltas in different entries of the local pattern buffer.

The method also includes, in response to determining that a first entry of the local pattern buffer contains at least m memory access deltas, where m is an integer greater than or equal to 2, selecting the values from the prefetch training table by calculating a hash based on a program counter value associated with a most recent memory access and the second set of consecutive memory access deltas, and performing a lookup of the hash in a correlation table to identify an entry in the prefetch training table containing the values.

In the method, the values selected from the prefetch training table include one or more of the first set of consecutive memory access deltas. The method also includes predicting one or more prefetch addresses based on the selected values and a memory address of a most recent memory access by the application.

In the method, the prefetch training table includes a correlation weight table, and the values from the prefetch training table represent weights in the correlation weight table. The updating the values in the prefetch training table further includes, for each memory access delta in a subset of memory access deltas from the first set of memory access deltas, in the correlation weight table, incrementing one of the weights associated with the memory access delta, a most recent memory access delta recorded in the local pattern buffer after the subset, and a sequence distance of the memory access delta from the most recent memory access delta.

In the method, the prefetch training table includes a correlation weight table. The method also includes, in response to determining that the local pattern buffer contains at least n memory access deltas for each memory access delta of the n memory access deltas, from the correlation weight table, selecting a set of weight values corresponding to the memory access delta and to a sequence position of the memory access delta relative to a sequence position of a future memory access delta, and adding the selected weight values to respective accumulated weight values in a sum register vector. The predicting one or more memory addresses for prefetching is based on an index of a highest accumulated weight value in the sum register vector after the adding the selected weight values has been performed for all of the n memory access deltas.

The method also includes performing a prefetch based on the predicted one or more memory addresses in response to determining that the highest accumulated weight value exceeds a threshold.

In the method, the prefetch training table includes a correlation weight table, the index of the highest accumulated weight value represents a predicted future memory access delta, and predicting one or more additional memory addresses for prefetching by performing a lookup in the correlation weight table based on the predicted future memory access delta and a most recent memory access delta.

In the method, the prefetch training table includes a correlation weight table. The method also includes, in response to detecting eviction of unused prefetched data from a cache, decrementing in the correlation weight table each of a set of weights associated with the evicted prefetched data.

A computing device includes a local pattern buffer for storing a first set of consecutive memory access deltas, where each of the consecutive memory access deltas represents a difference between two memory addresses accessed by an application, a prefetch training table to store prefetch training data, and prefetch logic coupled with the local pattern buffer and the prefetch training table. The prefetch logic, in response to determining that the first set of consecutive memory access deltas includes a predetermined quantity of memory access deltas, updates values in the prefetch training table based on the first set of memory access deltas, selects the values from the prefetch training table based on a second set of consecutive memory access deltas received in the local pattern buffer, and based on the selected values, predicts one or more memory addresses for prefetching.

The computing device also includes a hash engine coupled with the prefetch logic to calculate a hash of a program counter and a first subset of the consecutive deltas, and a correlation table coupled with the prefetch logic. The prefetch logic is for storing the hash in the correlation table in response to determining that a first entry of the local pattern buffer contains at least m+(n−m)×i memory access deltas, where m<n, and i is an integer greater than or equal to 0.

In the computing device, the prefetch training table includes a pattern history table, and the prefetch logic updates the values in the prefetch training table by copying a first subset of the consecutive memory access deltas from the local pattern buffer to the pattern history table.

In the computing device, a hash engine calculates a hash based on a program counter value associated with a most recent memory access and the second set of consecutive memory access deltas. The prefetch logic, in response to determining that a first entry of the local pattern buffer contains at least m memory access deltas, where m is an integer greater than or equal to 2, selects the values from the prefetch training table by performing a lookup of the hash in a correlation table to identify an entry in the prefetch training table containing the values.

In the computing device, the values selected from the prefetch training table include one or more of the first set of consecutive memory access deltas, and the prefetch logic predicts one or more prefetch addresses based on the selected values and a memory address of a most recent memory access by the application.

In the computing device, the prefetch training table includes a correlation weight table, and the values from the prefetch training table represent weights in the correlation weight table. The prefetch logic updates the values in the prefetch training table by, for each memory access delta in a subset of memory access deltas from the first set of memory access deltas, in the correlation weight table, incrementing one of the weights associated with the memory access delta, a most recent memory access delta recorded in the local pattern buffer after the subset, and a sequence distance of the memory access delta from the most recent memory access delta.

In the computing device, the prefetch training table includes a correlation weight table, and the prefetch logic, in response to determining that the local pattern buffer contains at least n memory access deltas, for each memory access delta of the n memory access deltas, selects from the correlation weight table a set of weight values corresponding to the memory access delta and to a sequence position of the memory access delta relative to a sequence position of a future memory access delta, and adds the selected weight values to respective accumulated weight values in a sum register vector. The predicting one or more memory addresses for prefetching is based on an index of a highest accumulated weight value in the sum register vector after the adding the selected weight values has been performed for all of the n memory access deltas.

A computing system includes a main memory, a cache memory, and a prefetcher coupled with the main memory and the cache memory. The prefetcher, in a local pattern buffer, records a first set of consecutive memory access deltas, where each of the consecutive memory access deltas represents a difference between two memory addresses in the main memory accessed by an application. The prefetcher also, in response to determining that the first set of memory access deltas includes a predetermined quantity of memory access deltas, updates values in a prefetch training table based on the first set of memory access deltas, selects the values from the prefetch training table based on a second set of consecutive memory access deltas received in the local pattern buffer, and based on the selected values, prefetches data from one or more prefetch memory addresses of the main memory to the cache memory.

The computing system also includes a hash engine for calculating a hash based on a program counter value associated with a most recent memory access and the second set of consecutive memory access deltas. The prefetch logic, in response to determining that a first entry of the local pattern buffer contains at least m memory access deltas, where m is an integer greater than or equal to 2, selects the values from the prefetch training table by performing a lookup of the hash in a correlation table to identify an entry in the prefetch training table containing the values, where the values include one or more of the first set of consecutive memory access deltas, and predicts the one or more prefetch memory addresses based on the selected values and a memory address of a most recent memory access by the application.

In the computing system, the prefetch training table includes a correlation weight table. The prefetcher, in response to determining that the local pattern buffer contains at least n memory access deltas, for each memory access delta of the n memory access deltas, selects from the correlation weight table a set of weight values corresponding to a the memory access delta and to a sequence position of the memory access delta relative to a sequence position of the future memory access delta, and adds the selected weight values to respective accumulated weight values in a sum register vector. The predicting one or more memory addresses for prefetching is based on an index of a highest accumulated weight value in the sum register vector after the adding the selected weight values has been performed for all of the n memory access deltas.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

The invention claimed is:

1. A method, comprising:
    recording a first set of consecutive memory access deltas, wherein each of the consecutive memory access deltas represents a difference between two memory addresses;
    updating values in a prefetch training table based on the first set of memory access deltas by copying a first subset of the consecutive memory access deltas to the prefetch training table; and
    predicting one or more memory addresses for prefetching based on the updated values in the prefetch training table.

2. The method of claim 1, wherein the updating values in a prefetch training table is performed in response to determining that the first set of consecutive memory access deltas includes a predetermined quantity of memory access deltas.

3. The method of claim 1, wherein the prefetch training table includes a pattern history table storing one or more entries, each of the one or more entries including a sequence of memory access delta values and an age field.

4. The method of claim 1, wherein the predicting is performed in response to a second set of consecutive memory access deltas.

5. The method of claim 4, further comprising:
    calculating each of the first set of consecutive memory access deltas based on memory addresses located in a first memory page;
    calculating each of a second set of consecutive memory access deltas based on memory addresses located in a second memory page; and
    storing the first set of consecutive memory access deltas and the second set of consecutive memory access deltas in different entries.

6. The method of claim 4, further comprising:
    in response to determining that a first entry contains at least m memory access deltas, wherein m is an integer greater than or equal to 2, selecting the values from the prefetch training table by:
        calculating a hash based on a program counter value associated with a most recent memory access and the second set of consecutive memory access deltas, and
        performing a lookup of the hash in a correlation table to identify an entry in the prefetch training table containing the values.

7. The method of claim 1, wherein:
    the values selected from the prefetch training table comprise one or more of the first set of consecutive memory access deltas; and
    the method further comprises predicting one or more prefetch addresses based on the selected values and a memory address of a most recent memory access by an application.

8. The method of claim 1, wherein:
    the prefetch training table comprises a correlation weight table;
    the values from the prefetch training table represent weights in the correlation weight table; and
    the updating the values in the prefetch training table further comprises, for each memory access delta in a subset of memory access deltas from the first set of memory access deltas:
        in the correlation weight table, incrementing one of the weights associated with:

the memory access delta,
a most recent memory access delta, and
a sequence distance of the memory access delta from the most recent memory access delta.

9. The method of claim 1, wherein:
the prefetch training table comprises a correlation weight table; and
the method further comprises, in response to determining that a local pattern buffer contains at least n memory access deltas:
for each memory access delta of the at least n memory access deltas,
from the correlation weight table, selecting a set of weight values corresponding to the memory access delta and to a sequence position of the memory access delta relative to a sequence position of a future memory access delta, and
adding the selected weight values to respective accumulated weight values in a sum register vector,
wherein the predicting one or more memory addresses for prefetching is based on an index of a highest accumulated weight value in the sum register vector after the adding the selected weight values has been performed for all of the at least n memory access deltas.

10. The method of claim 9, further comprising performing a prefetch based on the predicted one or more memory addresses in response to determining that the highest accumulated weight value exceeds a threshold.

11. The method of claim 1, wherein:
the prefetch training table comprises a correlation weight table;
an index of a highest accumulated weight value represents a predicted future memory access delta; and
predicting one or more additional memory addresses for prefetching by performing a lookup in the correlation weight table based on the predicted future memory access delta and a most recent memory access delta.

12. The method of claim 1, wherein:
the prefetch training table comprises a correlation weight table; and
the method further comprises, in response to detecting eviction of unused prefetched data from a cache, decrementing in the correlation weight table each of a set of weights associated with the evicted prefetched data.

13. A computing device, comprising:
a storage device to store a first set of consecutive memory access deltas, wherein each of the consecutive memory access deltas represents a difference between two memory addresses accessed by an application;
memory adapted to store prefetch training data in a prefetch training table; and
prefetch logic configured to:
update values in the prefetch training table based on the first set of consecutive memory access deltas by copying a first subset of the first set of consecutive memory access deltas to the prefetch training table; and
predict one or more memory addresses for prefetching based on values in the prefetch training table.

14. The computing device of claim 13, wherein the prefetch logic is configured to update the values in the prefetch training table in response to determining that the first set of consecutive memory access deltas includes a predetermined quantity of memory access deltas.

15. The computing device of claim 13, wherein the prefetch training table comprises a pattern history table storing one or more entries, each of the one or more entries including a sequence of memory access delta values and an age field.

16. The computing device of claim 13, wherein the prefetch logic is configured to predict the one or more memory addresses for prefetching in response to a second set of consecutive memory access deltas.

17. The computing device of claim 13, further comprising:
a hash engine configured to calculate a hash based on a program counter value associated with a most recent memory access and a second set of consecutive memory access deltas,
wherein the prefetch logic is further configured to:
in response to determining that a first entry contains at least m memory access deltas, wherein m is an integer greater than or equal to 2, select the values from the prefetch training table by performing a lookup of the hash in a correlation table to identify an entry in the prefetch training table containing the values.

18. The computing device of claim 13, wherein:
values selected from the prefetch training table comprise one or more of the first set of consecutive memory access deltas; and
the prefetch logic is further configured to predict one or more prefetch addresses based on the selected values and a memory address of a most recent memory access by an application.

19. The computing device of claim 13, wherein:
the prefetch training table comprises a correlation weight table;
the values from the prefetch training table represent weights in the correlation weight table; and
the prefetch logic is configured to update the values in the prefetch training table by, for each memory access delta in a subset of memory access deltas from the first set of memory access deltas, in the correlation weight table, incrementing one of the weights associated with:
the memory access delta,
a most recent memory access delta, and
a sequence distance of the memory access delta from the most recent memory access delta.

20. A computing system, comprising:
a main memory;
a cache memory; and
a prefetcher coupled with the main memory and the cache memory, wherein the prefetcher is configured to:
record a first set of consecutive memory access deltas, wherein each of the consecutive memory access deltas represents a difference between two memory addresses in the main memory accessed by an application;
update values in a prefetch training table based on the first set of consecutive memory access deltas by copying a first subset of the first set of consecutive memory access deltas to the prefetch training table; and
prefetch data from one or more prefetch memory addresses of the main memory to the cache memory based on values in the prefetch training table.

* * * * *